May 14, 1957 H. REDLICH 2,792,454

STORAGE DEVICE

Filed Jan. 14, 1955

INVENTOR.
HORST REDLICH
BY
Michael S. Striker
Agt.

United States Patent Office 2,792,454

Patented May 14, 1957

2,792,454

STORAGE DEVICE

Horst Redlich, Berlin-Steglitz, Germany, assignor to Teldec Schallplatten G. m. b. H., Hamburg, Germany Application January 14, 1955, Serial No. 481,946

Claims priority, application Germany January 21, 1954

8 Claims. (Cl. 179—100.1)

The present invention relates to a storage device and more particularly to a storage device for storing voltage impulses for use with recording apparatus.

When recording sound tracks on a record made in the form of a disc or a cylinder, the amount of usable space of the record is limited by the physical size thereof. The space is used by recording the sound track in the form of a continuous helix. If a very small distance is provided between the adjacent grooves of the helix, the length of the helix will be substantially longer than if a large distance is provided between the adjacent grooves, for the same size record. However, the distance between the adjacent grooves is limited by the amplitude of the sound tracks recorded in the grooves.

If it is desired to permit a wide variation of volume in the sound track, it is apparent that a wide space must be left between adjacent grooves. That is, the space must be large enough to permit the recording of two sound tracks having the largest amplitude in adjacent sound without these tracks running into each other. However, since the sound tracks will only have the largest permissible amplitude for very short time periods, leaving a constant large space between all the grooves will waste most of the available space on the record and the length of the helix will be substantially smaller than desired.

Accordingly recording apparatus have been devised which automatically varies the distance between the center lines of the adjacent grooves on a record depending upon the amplitude of the sound track to be recorded as well as the amplitude of the sound track already recorded in the adjacent groove. An important part of such recording apparatus is a storage device which stores the voltage signals of the sound track that has already been recorded and then reproduces the signals after a predetermined time interval. Usually the predetermined time interval is substantially equal to the time of one revolution of the record being cut.

Accordingly, it is an object of the present invention to provide a new and improved storage device.

Another object of the present invention is to provide a new and improved storage device for storing voltage impulses for a predetermined time interval and then reproducing the voltage impulses.

Still another object of the present invention is to provide a storage device which will store voltage impulses corresponding respectively to the negative and positive portions of audio frequencies to be recorded on a record.

A further object of the present invention is to provide a storage device for storing, for a predetermined time interval, voltage impulses corresponding respectively to negative and positive portions of voltage signals to be recorded on a record and which automatically eliminates the stored impulses if the predetermined time interval exceeds a desired amount.

With the above objects in view the present invention mainly consists in a storage device for voltage impulses including means for recording each of the voltage impulses to be stored, means for maintaining the impulses in recorded form for a predetermined time interval, means for automatically determining the predetermined time interval, and means for automatically reproducing each of the voltage impulses at the end of the predetermined time interval.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
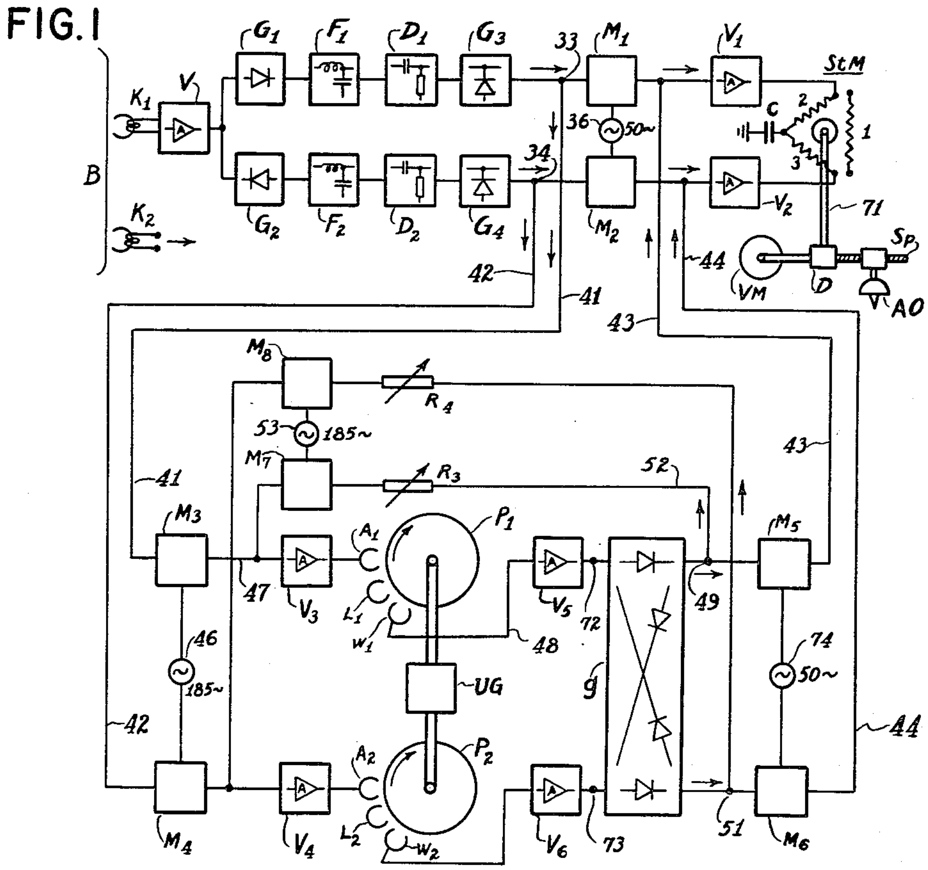
Fig. 1 is a block diagram of a recording apparatus showing the storage device in schematic form.
Figure 3:
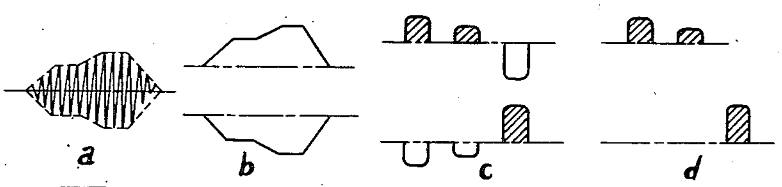
Figure 4:
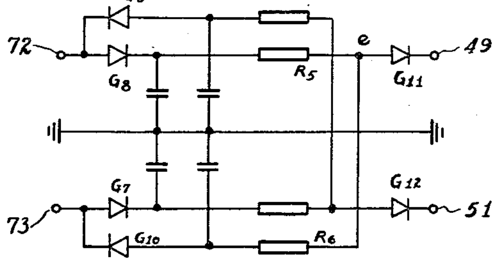

Fig. 3 including sub-figures 3*a* to 3*d* shows the wave shapes of voltage signals appearing at different portions of the circuit of Fig. 1; and Fig. 4 is a schematic diagram of a portion of the storage device shown only in block form in Fig. 1.

Referring now to the drawings, and more particularly to Figs. 1 and 3, a magnetic tape B containing the sound tracks to be recorded moves past a reproducing head K1 in the direction of the arrow 31. The tape B simultaneously moves past a second reproducing head K2 so that the sound track that has been reproduced by the head K1 reaches the head K2 after a predetermined time interval. In the reproducing head K2 the sound track is converted into the corresponding audio frequency voltage signals and applied in the direction of the arrow 32 directly to a recording head A0 where, in a known manner, it moves the stylus in the recording head A0 to cut the proper pattern in the groove of the disc.

However, before the sound track reaches the recording head A0, the head must be positioned so that it will not interfere with the adjacent grooves on the record. This is the function initiated by the audio frequency signals produced in the reproducing head K1. These signals have the wave shape of the type shown in Fig. 3*a*, for example. From the reproducing head K1 the signals are amplified in an amplifier V and then split into two separate channels. The upper channel has, as its first element, a rectifier G1 which passes only the positive portions of the signal voltages. The lower channel has, as its first element, a rectifier G2 arranged in opposite polarity to the rectifier G1 so that it passes only the negative portions of the signal voltages. The outputs of the rectifiers G1 and G2 are smoothed by filters F1 and F2, respectively, so that at the output of these filters the signal voltages have the shape of the envelopes as shown in Fig. 3*b*.

The positive envelope portion of the signal voltages is differentiated in a differentiator circuit D1 which, in a manner well known in the art, provides an output only when the voltage applied thereto is changing. Therefore, the positive portion of the wave shape shown in Fig. 3*b* will produce three impulses, two positive and one negative, as shown in Fig. 3*c*. Similarly, the negative portion of the wave shape shown in Fig. 3*b* will produce three impulses, two negative and one positive. It will be noted that the space between each of the formed impulses corresponds to that portion of the wave shape in Fig. 3*b* that has a constant amplitude.

For the purposes of the present invention, only the positive impulses are desired and these impulses are shown cross hatched in Fig. 3*c*. Accordingly, at the output of each of the differentiators D1 and D2 is respectively located a rectifier G3 and a rectifier G4 for eliminating the negative pulses. Therefore, at the output terminal 33 of the upper channel is produced two positive impulses shown in the upper portion of Fig. 3*d*. At the output terminal 34 of the lower channel is produced a single positive impulse as shown in the lower portion of Fig. 3*d*.

The outputs appearing at the terminals 33 and 34 are respectively applied through decoupling resistors R1 and R2 to modulators M1 and M2. An alternating current generator 36 is provided for the modulators M1 and M2 for supplying the modulating frequency. This frequency may be 50 cycles, for example, or the equivalent supply voltage frequency.

It can be seen that the output impulses appearing at 33 and 34 are simultaneously applied on conductors 41 and 42 respectively to the storage device whose circuit will be described hereinbelow. The outputs of the storage device are taken respectively on conductors 43 and 44 and applied to the output of the modulators M1 and M2.

The function of the storing circuit is to store the impulses applied to its for a time interval substantially equal to one revolution of the disc being cut. Therefore it is seen that at the output of each of the modulators M1 and M2, two superimposed series of modulated impulses are produced. One of the series of modulated impulses is derived from the sound track to be recorded. The second series of modulated impulses is derived from the sound track which has already been recorded in the groove adjacent to the present groove to be cut.

The two superimposed series of modulated impulses appearing at the output of the modulator M1 are amplified in the amplifier V1 and applied to the auxiliary winding 2 of a control motor S*t*M. Similarly, the two superimposed series of modulated impulses appearing at the output of the modulator M2 are amplified in the amplifier V2 and applied to the auxiliary winding 3 of the control motor S*t*M.

The control motor S*t*M may be a conventional two-phase inductance motor with its main winding 1 connected across the power lines. Accordingly, its speed of rotation and its direction of rotation depends on the amplitude of the voltage applied to its auxiliary windings. That is, if positive voltage is applied to the winding 2, the motor S*t*M will rotatate in one direction. If positive voltage is applied to the winding 3, the motor will rotate in the opposite direction. Therefore, the operation of the control motor S*t*M will move the recording head A0 towards or away from the center of the disc being cut in accordance with the amplitude of the sound track to be recorded and the amplitude of the sound track already recorded in the adjacent groove of the record.

The control motor S*t*M is connected by means of a rotatable shaft 71 to a differential transmission D. To one side of the differential transmission D is also connected a motor VM. To the other side of the differential transmission D is connected a rotatable rod S*p* on which is mounted the recording head A0. The motor VM operates to drive the recording head A0 at a constant rate towards the center of the disc being cut, therefore cutting a continuous helix in the surface of the disc. By means of the differential transmission D, the control motor S*t*M is able to increase or decrease the rate of movement of the recording head A0 as well as change its direction.

Figure 2:
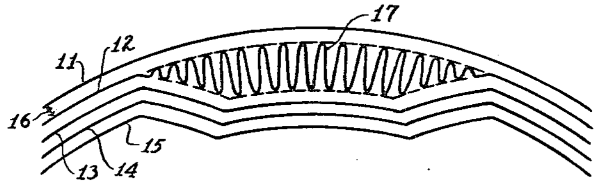
Fig. 2 is a plan view of a record on which the recording grooves are being cut.

Referring now to Fig. 2, a portion of the disc to be cut is illustrated in plan view. The stylus of the recording head A0 starts at the outer edge of the disc and cuts a continuous helix towards the center thereof. The distance between the adjacent groove to be cut, indicated as 16 in Fig. 2, is fixed at a desired distance and the motor VM is energized to rotate at a constant speed to drive the recording head A0 towards the center of the disc so that the distance between the center lines of the adjacent grooves will be set at the minimum distance 16.

The first groove cut in the disc of Fig. 2 is indicated by the numeral 11 and in this instance no modulation is present in the sound track for that portion illustrated. However, in the groove 12 the sound track contains a modulation 17 having an amplitude substantially wider than the minimum distance 16. Accordingly, the center line of the groove 12 is shifted by the modulated impulses so that the sound track 17 will not run into the groove 11. At the end of the modulation of the sound track 17, the recording head is brough back so that the groove 12 is spaced the minimum distance 15 from the groove 11.

As can be seen in Fig. 2 the remaining grooves 13, 14 and 15 cut in the record contain no sound track with large modulation. Accordingly, if the groove 13 is cut by the recording head A0 at the minimum distance 16 from the groove 12, it is seen that the groove 13 will run into the modulated portion 17 of the sound track in the groove 12. Therefore, when the groove 13 approaches that portion of the groove 12 containing the modulation, the recording head is moved towards the center of the disc at a time period shortly before the time corresponding to the start of the modulation 17. This movement of the recording head is continued until the maximum amplitude of the modulation 17 is reached at which time the control motor S*t*M stops rotating and permits the minimum distance 16 to be maintained between the groove 13 and the maximum amplitude of the modulation 17.

When the amplitude of the modulation 17 starts to decrease, the recording head is moved away from the center of the disc until the modulation ends at which time the motor S*t*M stops rotating and the groove 13 is maintained at the minimum distance 16 by the constant rotation of the motor VM.

While no modulation is present in the groove 13, it is apparent that the succeeding grooves 14, 15, etc., must also make allowance for the irregularity of the groove 13 caused by the bypassing of the modulation 17. Accordingly, as will be explained hereinafter, the cutting of the grooves 14, 15, etc. is controlled by the storing circuit which continues to apply the required changes by means of a feedback circuit.

The circuit for carrying out the storage function of the recording apparatus is shown in Fig. 1. The positive impulses appearing at the output terminals 33 and 34 of the upper and lower channels, respectively, are applied on conductors 41 and 42, respectively to modulators M3 and M4. Modulators M3 and M4 are supplied by an alternating current supply 46 having a frequency, such as 185 cycles per second or any suitable frequency which does not contain any harmonics of the modulating frequency used with the modulators M1 and M2 of Fig. 1.

The output of the modulator M3 is taken on conductor 47, amplified in amplifier V3 and applied to a recording head A1 of a magnetic recorder. The recording head A1 magnetically records the modulated amplified positive impulses on the magnetic disc P1 which rotates at a speed equivalent to the speed of the record being cut by the recording head A0.

After the disc P1 has rotated slightly less than one complete revolution the magnetically recorded modulated impulses are picked up by the reproducing head W1 and applied on conductor 48 to an amplifier V5 where they are amplified and applied to the input terminal 72 of a rectifier device *g*.

It should be noted that these output stored impulses are applied slightly before a complete revolution has been made. In Fig. 2 it can be seen that the groove 13 must start to rise shortly before the start of the modulation in the groove 12. Similarly, the groove 13 returns to its normal position shortly after the end of the modulation 17. Accordingly, the series of impulses corresponding to the negative portion of the voltage signals should be applied shortly after a complete revolution of the disc being cut.

This last requirement is met in the storage device in the following manner: The series of positive impulses corresponding to the negative portion of the voltage signal of the sound track are applied on conductor 42 to the modulator M4 where they are modulated and then amplified by the amplifier V4. The output of the amplifier V4 is applied to the recording head A2 which magnetically records the modulated impulses on the magnetic disc P2. It can be seen that the disc P2 is driven from the shaft rotating P1 through a transmission UG. The transmission UG is a step-down transmission so that the speed of rotation of the disc P2 is slightly lower than the speed of rotation of the disc P1.

In the same manner as indicated above, the impulses recorded on the disc P2 are picked up by the reproducing head W2, amplified in the amplifier V6 and applied to the input terminal 73 of the rectifier device *g*. Since the speed of rotation of the disc P2 is slightly less than the speed of rotation of the record being cut, the modulated impulses recorded by the recording head A2 will not be picked up by the reproducing head W2 until shortly after a complete revolution of the disc being cut.

Referring now to Fig. 4 the operation and function of the rectifier device *g* will be described. In Fig. 4 six rectifiers G7, G8, G9, G10, G11 and G12, are shown in conjunction with their respective load resistors and capacitors. It can be seen that positive impulses emanating from the amplifier V5 and applied to input terminal 72 will proceed through the rectifier G8 and its resistor R5 to the junction point *e*. Similarly, negative impulses emanating from the amplifier V6 and applied to the input terminal 73 will proceed through the rectifier G10 and the load resistor R6 to the same terminal *e*.

Accordingly, if a positive impulse is emitted in the upper channel, modulated at a frequency of 185 cycles, it will reach the terminal *e* and proceed through the rectifier G11 to the output terminal 49 of the rectifier device. However, if a negative impulse is simultaneously emitted in the lower channel, modulated at a frequency of 185 cycles, it will proceed through the rectifier G10 and the resistor R6 to the terminal *e*. If these two impulses are of the same amplitude they will eliminate each other and no voltage will appear at the output terminal 49. If the positive impulse is larger, the different voltage will appear at 49. If the negative impulse is larger, no voltage will appear at 49 because of the rectifier G11.

Similarly, positive impulses in the lower channel will proceed through rectifier G7 to the output terminal 51 unless they are eliminated by simultaneously occurring negative impulses in the upper channel which proceeds through the rectifier G9.

The advantages of the above rectifier device become apparent in the case where the sound track recorded in the groove of the disc is modulated with a large amplitude for a complete revolution of the disc being cut. In this event the next groove to be cut should be moved a fixed distance away from the adjacent sound track and not have to be moved back. Similarly, the subsequent grooves do not have to be corrected any more for the modulation appearing in the groove containing the modulation for one complete revolution.

From the above rotational speed of the magnetic discs P1 and P2 it is seen that this correction will occur in the rectifier device *g* when the total modulation present in the previous groove plus the earlier rise time and later decrease time of the groove being cut equals one complete revolution.

Referring again to Fig. 1 it can be seen that between the reproducing head W1 and the recording head A1 is an erasing head L1 and a similar erasing head L2 is located between the reproducing head W2 and the recording head A2. Therefore, after the modulated impulses have been picked up by the respective heads W1 and W2 they are erased by the erasing heads L1 and L2 and the discs P1 and P2 are ready to receive the next impulses.

It can be seen that feedback circuits are also connected to the terminals 49 and 51, respectively. From the terminal 49 a conductor 52 applies the output impulses through an adjustable resistor R3 to a modulator M7. The modulator M7 is supplied with an alternating frequency source 53 equal to the alternating frequency supplied by the source 46. The modulated output impulses from the modulator M7 are applied to the input of the amplifier V3 where they are superimposed upon the modulated impulses emitted by the modulator M3. Therefore, the impulses actually recorded by the recording head A1 include both the impulses to be recorded as well as the impulses which have just been recorded. It is seen that this type of feedback will continue to add the fixed amount to the succeeding impulses which will cause the succeeding grooves, such as 13, 14, and 15, etc., to be moved an amount sufficient to avoid the irregularities of the previously recorded grooves.

The impulses appearing on the output terminals 49 and 51 are applied to modulators M5 and M6, respectively. Modulators M5 and M6 are supplied with an alternating current source 74 having a frequency equal to the source 36. From the modulators M5 and M6 the modulated impulses are applied on output conductors 43 and 44 to the outputs of the modulators M1 and M2, respectively where they operate the recording apparatus as described above.

It will be understood that each of the elements described above, or two or more together, may also find a useful application in other types of storage devices differing from the types described above.

While the invention has been illustrated and described as embodied in a storage device for recording apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A storage apparatus for a plurality of series of voltage impulses comprising, in combination, first modulating means for modulating one series of voltage impulses; second modulating means for modulating a second series of voltage impulses; first recording means for recording each of the series of the voltage impulses modulated in said first modulating means; second recording means for recording each of said series of impulses modulated in said second modulated means; means for maintaining the first series of modulated impulses for a predetermined time interval; means for automatically determining said predetermined time interval; means for maintaining the second series of modulated impulses for a time interval greater than said predetermined time interval; means for automatically reproducing the series of modulated voltage impulses at the end of said predetermined time interval; and means for automatically reproducing the second series of modulated impulses at the end of the time interval greater than said predetermined time interval.

2. A storage apparatus for a plurality of series of voltage impulses comprising, in combination, first modulating means for modulating one series of voltage impulses; second modulating means for modulating a second series of voltage impulses; first recording means for recording each of the series of the voltage impulses modulated in said first modulating means; second recording means for recording each of said series of impulses modulated in said second modulated means; means for maintaining the first series of modulated impulses for a predetermined time interval; means for automatically determining said predetermined time interval; means for maintaining the second series of modulated impulses for a time interval greater than said predetermined time interval; means for automatically reproducing the series of modulated voltage impulses at the end of said predetermined time interval; means for automatically reproducing the second series of modulated impulses at the end of the time interval greater than said predetermined time interval; first feedback means for feeding back the reproduced voltage impulses of one series of impulses to the output of said first modulating means; third modulating means connected in circuit between said first feedback means and the output of said first modulating means for modulating the reproduced voltage impulses of said series; second feedback means for feeding back the reproduced voltage impulses of one of said second series of voltage impulses to the output of said second modulating means; fourth modulating means connected in circuit between said second feedback means and the output of said second modulating means for modulating the reproduced voltage impulses of said second series, and means for automatically eliminating any positive reproduced voltage impulse of one series that occurs simultaneously with a negative reproduced voltage impulse of the other series.

3. A storage apparatus for a plurality of series of voltage impulses comprising, in combination, first modulating means for modulating one series of voltage impulses; second modulating means for modulating a second series of voltage impulses; first recording means including a first magnetic disc for magnetically recording each of the series of the voltage impulses modulated in said first modulating means; second recording means including a second magnetic disc for magnetically recording each of said series of impulses modulated in said second modulated means; means for maintaining the first series of modulated impulses for a predetermined time interval; means for automatically determining said predetermined time interval; means for maintaining the second series of modulated impulses for a time interval greater than said predetermined time interval; means for automatically reproducing the series of modulated voltage impulses at the end of said predetermined time interval; means for automatically reproducing the second series of modulated impulses at the end of the time interval greater than said predetermined time interval; and means for erasing the magnetically recorded voltage impulses after they have been reproduced.

4. A storage apparatus for a plurality of series of voltage impulses comprising, in combination, first recording means for recording a first series of said plurality of series of voltage impulses; second recording means for recording a second series of impulses of said plurality of impulses; means for maintaining said first recorded series of impulses for a predetermined time interval; means for maintaining said second recorded series of voltage impulses for a second time interval greater than said predetermined time interval; means for automatically reproducing said first series of recorded impulses at the end of said predetermined time interval; and means for automatically reproducing said second series of recorded impulses at the end of said second time interval.

5. A storage apparatus for a plurality of series of voltage impulses comprising, in combination, first recording means for recording a first series of said plurality of series of voltage impulses; second recording means for recording a second series of impulses of said plurality of impulses; means for maintaining said first recorded series of impulses for a predetermined time interval; means for maintaining said second recorded series of voltage impulses for a second time interval greater than said predetermined time interval; means for automatically reproducing said first series of recorded impulses at the end of said predetermined time interval; means for automatically reproducing said second series of recorded impulses at the end of said second time interval; and means for automatically eliminating any positive voltage impulses of one of said reproduced series of impulses that occurs simultaneously with any negative voltage impulses of the other of said reproduced series of impulses.

6. A storage apparatus for a plurality of series of voltage impulses comprising, in combination, first recording means having an input for recording a first series of said plurality of series of voltage impulses, said first recording means having an output; second recording means having an input for recording a second series of impulses of said plurality of impulses, said second recording means having an output; means for maintaining said first recorded series of impulses for a predetermined time interval; means for maintaining said second recorded series of voltage impulses for a second time interval greater than said predetermined time interval; means connected to the output of said first recording means for automatically reproducing said first series of recorded impulses at the end of said predetermined time interval; means connected to the output of said second recording means for automatically reproducing said second series of recorded impulses at the end of said second time interval; and feedback means for feeding back said reproduced first and second series of impulses respectively to the inputs of said first and second recording means.

7. A storage apparatus for a plurality of series of voltage impulses comprising, in combination, first recording means having an input for recording a first series of said plurality of series of voltage impulses, said first recording means having an output; second recording means having an input for recording a second series of impulses of said plurality of impulses, said second recording means having an output; means for maintaining said first recorded series of impulses for a predetermined time interval; means for maintaining said second recorded series of voltage impulses for a second time interval greater than said predetermined time interval; means connected to the output of said first recording means for automatically reproducing said first series of recorded impulses at the end of said predetermined time interval; means connected to the output of said second recording means for automatically reproducing said second series of recorded impulses at the end of said second time interval; feedback means for feeding back said reproduced first and second series of impulses respectively to the inputs of said first and second recording means; and means for automatically eliminating any positive voltage impulses of one of said reproduced series of impulses that occurs simultaneously with any negative voltage impulses of the other of said reproduced series of impulses.

8. In a recording arrangement wherein a disc record rotating at a predetermined speed is cut by a recording stylus in response to an electrical signal, a storage apparatus for controlling auxiliary movements of the recording stylus, in combination, means for converting said electrical signal into a first and second series of voltage impulses; first recording means for recording said first series of voltage impulses; second recording means for recording said second series of voltage impulses; means for maintaining said first recorded series of impulses for a predetermined time interval corresponding to the time for one revolution of said disc record; means for maintaining said second recorded series of impulses for a second time interval greater than said predetermined time interval; means for automatically reproducing said first and second series of recorded impulses at the end of said predetermined and second time intervals, respectively; control means responsive to said reproduced series of voltage impulses for moving said recording stylus in an auxiliary manner depending upon said reproduced series of voltage impulses; and means for eliminating said reproduced first and second series of impulses when the same continuously occur for a time interval equal to said second time interval.

References Cited in the file of this patent

UNITED STATES PATENTS

| | | |
|---|---|---|
| 2,112,699 | Kleber | Mar. 29, 1938 |
| 2,611,038 | Graham | Sept. 16, 1952 |
| 2,674,660 | Ambrose | Apr. 6, 1954 |